(12) United States Patent
Chaudhary et al.

(10) Patent No.: US 12,072,815 B1
(45) Date of Patent: Aug. 27, 2024

(54) TECHNIQUES FOR DATA BUS INVERSION WITH IMPROVED LATENCY

(71) Applicant: NVIDIA CORPORATION, Santa Clara, CA (US)

(72) Inventors: Anurag Chaudhary, San Jose, CA (US); Scott Matthew Pitkethly, Tampa, FL (US); Peter Lindsay Gentle, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/177,237

(22) Filed: Mar. 2, 2023

(51) Int. Cl.
*G06F 13/00* (2006.01)
*G06F 13/16* (2006.01)
*G06F 13/40* (2006.01)

(52) U.S. Cl.
CPC ........ *G06F 13/161* (2013.01); *G06F 13/4027* (2013.01); *G06F 2213/0038* (2013.01)

(58) Field of Classification Search
None
See application file for complete search history.

(56) References Cited

U.S. PATENT DOCUMENTS

| 4,882,629 A | * | 11/1989 | Faulkerson | .......... H04N 1/1077 358/464 |
| 6,163,284 A | * | 12/2000 | Munakata | ............... H03M 5/12 341/68 |
| 2022/0188013 A1 | * | 6/2022 | Woo | ..................... G11C 7/1057 |

* cited by examiner

*Primary Examiner* — Henry Tsai
*Assistant Examiner* — Dean Phan
(74) *Attorney, Agent, or Firm* — Squire Patton Boggs LLP; Sarah Mirza

(57) ABSTRACT

Various embodiments include a network for transmitting data words from a source node to a destination node. The source node optionally inverts the logic levels of each data word so that the number of logic '1' bits in each data word is less than or equal to half of the data bits. The destination node recovers the original data words by passing the data words not inverted by the source node and inverting the data words that were inverted by the source node. As the packet is transmitted through the network, each node encodes and/or decodes the data words by generating an output transition for each logic '1' bit of the input data word. Because no more than half the bits of the input data word are logic '1' bits, the node generates output transitions for no more than one half of the data bits.

20 Claims, 7 Drawing Sheets

TECHNIQUES FOR DATA BUS INVERSION WITH IMPROVED LATENCY

BACKGROUND

Field of the Various Embodiments

Various embodiments relate generally to computer-based networks and, more specifically, to techniques for data bus inversion with improved latency.

Description of the Related Art

A computer system generally includes, among other things, one or more processing units, such as central processing units (CPUs) and/or graphics processing units (GPUs), and one or more memory systems. In some examples, one or more components of the computer system can be integrated to form a single system. For example, a CPU and a GPU, along with other connection circuitry, can be integrated on a single chip to form a system on chip (SoC). A network integrated onto the SoC facilitates communication among the components of the SoC. Additionally or alternatively, the network integrated into the SoC facilitates communication between one or more components of the SoC and one or more components external to the SoC. These external components can include a memory system, another SoC, another computer system, and/or the like.

The network can apply various encoding/decoding techniques to reduce power consumption resulting from transmitting signals among the components of the computer system. One such encoding/decoding technique is data bus inversion (DBI). With DBI, a source node reduces the number of logic transitions when transmitting a group of data words, referred to herein as a data packet or, more simply, a packet, to a destination node. For each data word included in the data packet, the source node transmits either the data word or a logical inversion of the data word, based on whether the original data word or the inversion of the data word has fewer logic transitions. The source node also transmits an inversion signal to indicate whether the original data word or the inversion of the data word is being transmitted. The destination node decodes the original data words of the packet by passing each received data word or inverting each received data word based on the state of the inversion signal. Reducing the number of transitions on a data bus and/or other signals helps to reduce power consumption. Reducing the number of transitions also reduces the power droop of the source power for the SoC, where such power droop can negatively impact circuit timing, resulting in reduced performance. Further, reducing the number of transitions can also reduce the likelihood of inductive noise where transitions on a group of signals can generate a false logic level on a nearby signal.

Further, the network includes intermediate nodes, also referred to herein as switch nodes, that receive packets from multiple source nodes and forward the received packets towards the corresponding destination node. Each node decodes the received packets, determines the destination node for each of the received packets, reencodes the packets, and forwards each packet to the destination node or to another intermediate node.

One disadvantage of this technique of encoding packets for transmission in a computer system is that the decoding and encoding process at each intermediate node is time consuming, thereby increasing the latency from when a source node transmits packets, and the corresponding destination node receives the packets. This increased packet latency results in reduced operating frequency of the computer system, leading to lower performance.

As the foregoing illustrates, what is needed in the art are more effective techniques for transmitting data packets in a computer system.

SUMMARY

Various embodiments of the present disclosure set forth a computer-implemented method for transmitting packets in a computer-based network. The method includes decoding, by an intermediate node, a first data bus inversion/direct current (DBI-DC) encoded data word received from a source node, where the source node encodes the first DBI-DC encoded data word using DBI-DC encoding and non-return-to-zero (NRZ) encoding. The method further includes applying, by the intermediate node, NRZ decoding and NRZ encoding to the first DBI-DC encoded data word to generate a second DBI-DC encoded data word. The method further includes transmitting, by the intermediate node, the second DBI-DC encoded data word to a destination node. The method further includes that the second DBI-DC encoded data word is decoded at the destination node using NRZ decoding and DBI-DC decoding.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, intermediate nodes in a network do not need to perform DBI decoding and DBI encoding of received packets in order to forward the received packets to the destination node or to another intermediate node. As a result, the latency from when a source node transmits packets, and the corresponding destination node receives the packets is reduced relative to conventional techniques. This reduced packet latency results in increased instruction throughput of the computer system processing elements, leading to higher performance. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
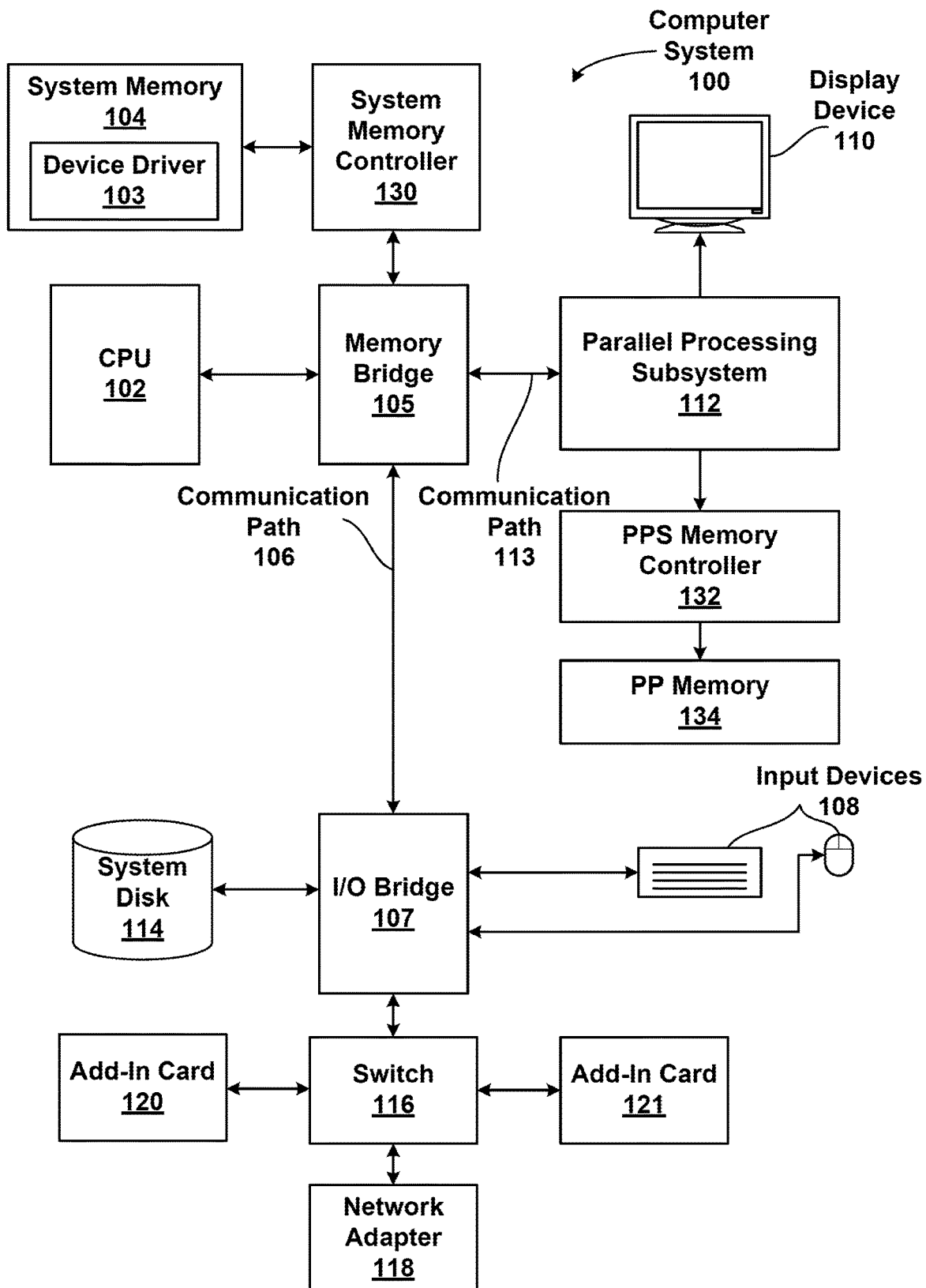
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is coupled to system memory 104 via a system memory controller 130. Memory bridge 105 is further coupled to an I/O (input/output) bridge 107 via a communication path 106, and I/O bridge 107 is, in turn, coupled to a switch 116. Parallel processing subsystem 112 is coupled to parallel processing (PP) memory 134 via a parallel processing subsystem (PPS) memory controller 132.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid-state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, and/or the like. In such embodiments, parallel processing subsystem 112 incorporates circuitry optimized for graphics and video processing, including, for example, video output circuitry. Such circuitry may be incorporated across one or more parallel processing units (PPUs) included within parallel processing subsystem 112. In some embodiments, each PUPS comprises a graphics processing unit (GPU) that may be configured to implement a graphics rendering pipeline to perform various operations related to generating pixel data based on graphics data supplied by CPU 102 and/or system memory 104. Each PPU may be implemented using one or more integrated circuit devices, such as programmable processors, application specific integrated circuits (ASICs), or memory devices, or in any other technically feasible fashion In some embodiments, parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other elements of FIG. 1 to form a single system. For example, parallel processing subsystem 112 may be integrated with CPU 102 and other connection circuitry on a single chip to form a system on chip (SoC). The computer system 100 includes a network-on-chip (NoC) fabric (not shown in FIG. 1) that enables components of the SoC to communicate with one another. Further, the NoC fabric enables components of the SoC to communicate with one or more components external to the SoC. These external components can include an external memory system, another SoC, another computer system, and/or the like. The network can apply various encoding/decoding techniques to reduce power consumption resulting from transmitting signals among the components of the computer system.

In operation, CPU 102 is the master processor of computer system 100, controlling and coordinating operations of other system components. In particular, CPU 102 issues commands that control the operation of PPUs within parallel processing subsystem 112. In some embodiments, CPU 102 writes a stream of commands for PPUs within parallel processing subsystem 112 to a data structure (not explicitly shown in FIG. 1) that may be located in system memory 104, PP memory 134, or another storage location accessible to both CPU 102 and the PPUs. A pointer to the data structure is written to a pushbuffer to initiate processing of the stream of commands in the data structure. The PPU reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

Each PPU includes an I/O (input/output) unit that communicates with the rest of computer system 100 via the communication path 113 and memory bridge 105. This I/O unit generates packets (or other signals) for transmission on communication path 113 and also receives all incoming packets (or other signals) from communication path 113, directing the incoming packets to appropriate components of the PPU. The connection of PPUs to the rest of computer system 100 may be varied. In some embodiments, parallel processing subsystem 112, which includes at least one PPU, is implemented as an add-in card that can be inserted into an expansion slot of computer system 100. In other embodiments, the PPUs can be integrated on a single chip with a bus bridge, such as memory bridge 105 or I/O bridge 107. Again, in still other embodiments, some or all of the elements of the PPUs may be included along with CPU 102 in a single integrated circuit or system of chip (SoC).

CPU 102 and PPUs within parallel processing subsystem 112 access system memory via a system memory controller 130. System memory controller 130 transmits signals to the memory devices included in system memory 104 to initiate the memory devices, transmit commands to the memory devices, write data to the memory devices, read data from the memory devices, and/or the like. In addition, PPUs and/or other components within parallel processing subsystem 112 access PP memory 134 via a parallel processing subsystem (PPS) memory controller 132. PPS memory controller 132 transmits signals to the memory devices included in PP memory 134 to initiate the memory devices, transmit commands to the memory devices, write data to the memory devices, read data from the memory devices, and/or the like.

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

The computer system 100 of FIG. 1 can include any number of memory systems, such as system memory 104 and parallel processing memory 134, within the scope of the disclosed embodiments. Further, as used herein, references to shared memory may include any one or more technically feasible memories, including, without limitation, a local memory shared by one or more PPUs within parallel processing subsystem 112, memory shared between multiple parallel processing subsystems 112, a cache memory, parallel processing memory 134, and/or system memory 104. Please also note, as used herein, references to cache memory may include any one or more technically feasible memories, including, without limitation, an L1 cache, an L1.5 cache, and L2 caches. In view of the foregoing, persons of ordinary skill in the art will appreciate that the architecture described in FIG. 1 in no way limits the scope of the various embodiments of the present disclosure.

Transmitting Data Packets in a Computer System Network

Various embodiments are directed to techniques for transmitting data packets in a computer system network fabric. Conventional DBI implementations apply a DBI-AC encoding/decoding technique. With DBI-AC, each data word in a data packet is inverted for transmission if transmitting the inverted data word results in fewer transitions than transmitting the original non-inverted data word. The decision to invert depends on the previously transmitted data word. Further, each node in the network fabric receives data packets from multiple source nodes via multiple ingress ports and transmits data packets to multiple destination nodes and other nodes via multiple egress ports. Because consecutive data words transmitted on an egress port could be from different source nodes, the previous data word could be from a different source node than the current data word. Therefore, in order to correctly encode the packets, the node performs DBI-AC decoding on the packets received at the ingress ports, routes each of the received packets to the appropriate egress ports, and, for each egress port, reencodes the data packets transmitted by that egress port. The process of decoding and reencoding at each node can introduce significant transmission latency, leading to reduced network performance.

With the disclosed techniques, DBI encoding is performed once at the source node. The source node applies a form of DBI encoding referred to herein as data bus inversion/direct current (DBI-DC) encoding/decoding. DBI-DC encoding is performed once, at the source node, as the packet is transmitted to the network. With DBI-DC encoding, the source node determines that a data word is inverted for transmission if transmitting the inverted data word results in fewer logic '1' bits than transmitting the original non-inverted data word. This determination does not depend on the previous data word that was transmitted. After DBI-DC encoding, less than or equal to 50% of the bits of the encoded word are logic '1' bits. The source node further transmits an inversion bit that indicates, for each data word, whether the data word is inverted.

Each intermediate node applies a non-return-to-zero (NRZ) encoding/decoding technique to the DBI-DC encoded packet. NRZ encoding generates a transition on word bits that are logic '1' bits. With DBI-DC encoding, the number of logic '1' bits for each data word is no more than 50%. Therefore, the data word, after both outer and inner encodings are applied, results in no more than 50% transitions on the data word transmitted through the network. Performing NRZ encoding/decoding has lower latency relative to conventional nodes that apply DBI-AC encoding/decoding. The destination node applies DBI-DC decoding to recover the original data words of the packet.

As a result, the network applies DBI-DC outer encoding and NRZ inner encoding. This DBI-DC encoding/decoding technique at the source node and destination node, along with NRZ encoding/decoding at the intermediate nodes, achieves the same reduction in transitions as conventional DBI-AC encoding/decoding, but with lower latency and higher network performance.

Figure 2:
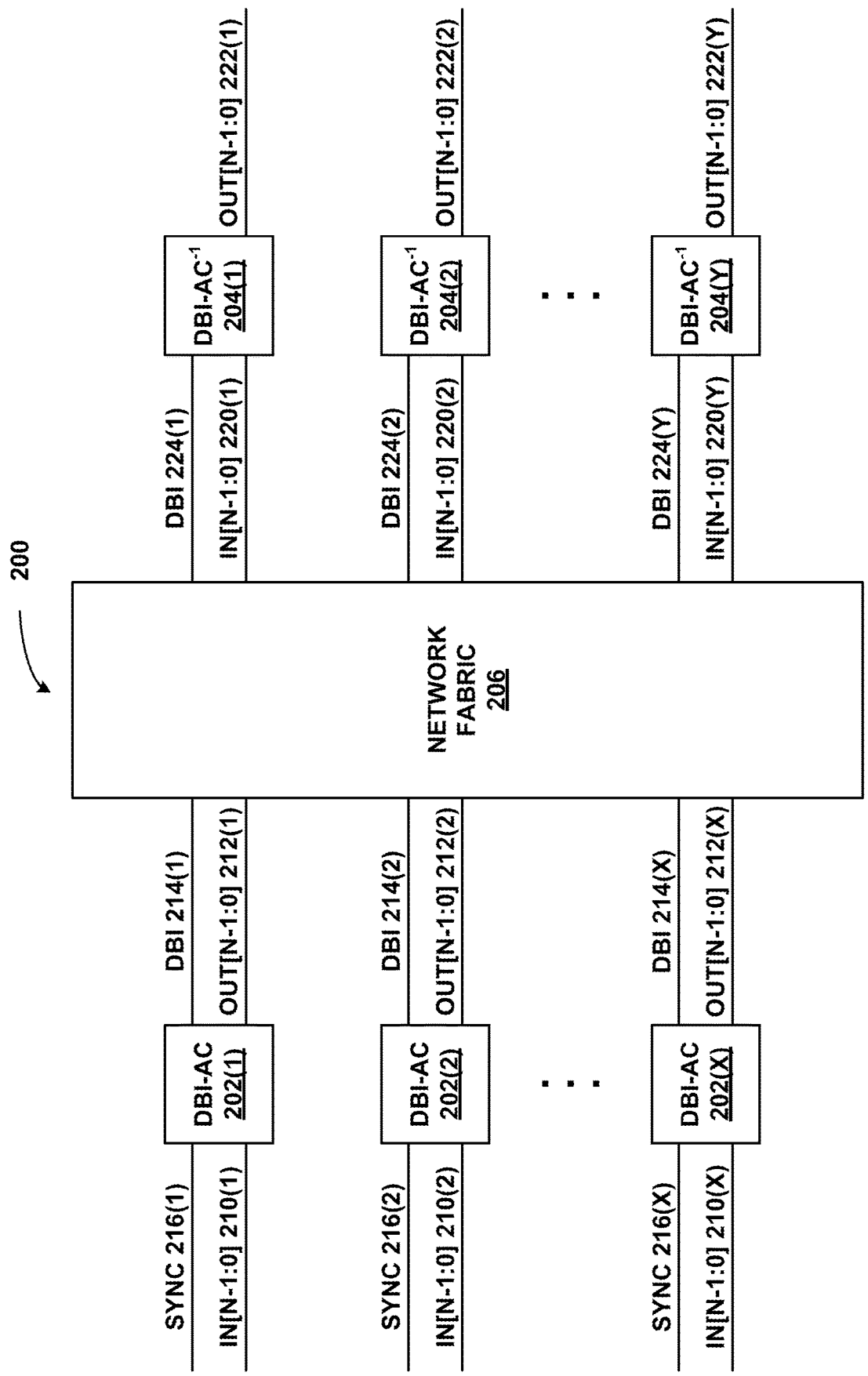
FIG. 2 is a block diagram of a data bus inversion/alternating current (DBI-AC) network included in the computer system of FIG. 1, according to various embodiments.

FIG. 2 is a block diagram of a data bus inversion/alternating current (DBI-AC) network 200 included in the computer system 100 of FIG. 1, according to various embodiments. As shown, the DBI-AC network 200 includes, without limitation, DBI-AC encoders 202(1), 202(2), . . . 202(X), DBI-AC$^{-1}$ decoders 204(1), 204(2), . . . 204(Y), and a network fabric 206.

DBI-AC encoders 202(1), 202(2), . . . 202(X) receive an input data word IN[N−1:0] 210(1), 210(2), . . . , 210(X) and generate an output data word OUT[N−1:0] 212(1), 212(2), . . . , 212(X) and an inversion output (DBI) 214(1), 214(2), . . . , 214(X). Each DBI-AC encoder 202 compares a current input data word 210 with the previous input data word as represented by the output data word 212. DBI-AC encoder 202 compares the two data words to determine if the current input data word 210 causes more than half of the data bits to transition, based on the previous input data word. If the current input data word 210 causes more than half of the data bits to transition, then DBI-AC encoder 202 inverts the current data word and asserts the inversion output 214. If the current input data word 210 causes less than or equal to half of the data bits to transition, then DBI-AC encoder 202 passes the current data word without inversion and does not assert the inversion output 214. DBI-AC encoders 202(1), 202(2), . . . 202(X) also receive a synchronization signal (SYNC) 216(1), 216(2), . . . , 216(X). An edge of the synchronization signal 216 causes DBI-AC encoder 202 to sample and store the output data word 212 and the inversion output 214.

Each DBI-AC encoder 202 transmits the sampled and stored output data word 212 and inversion output 214 to the network fabric 206. The network fabric 206 includes a number of nodes (not shown). Each node receives the output data word 212 and inversion output 214 from one or more DBI-AC encoders 202. Each node performs DBI-AC decoding on the received data words, routes each of the received packets to the appropriate output, and, for each output, performs DBI-AC encoding on the data packets transmitted by that output. The node transmits the output to another node in the network fabric 206 or to one of the DBI-AC$^{-1}$ decoders 204(1), 204(2), . . . 204(Y). DBI-AC$^{-1}$ decoders 204 receive an input data word IN[N−1:0] 220(1), 220(2), . . . , 220(X) and an inversion input (DBI) 224(1), 224(2), . . . , 224(X). DBI-AC$^{-1}$ decoders 204 generate an output data word IN[N−1:0] 222(1), 222(2), . . . , 222(X). Each DBI-AC$^{-1}$ decoder 204 decodes the input data word 222 based on the inversion input 224 to generate the output data word 212.

Figure 3A:
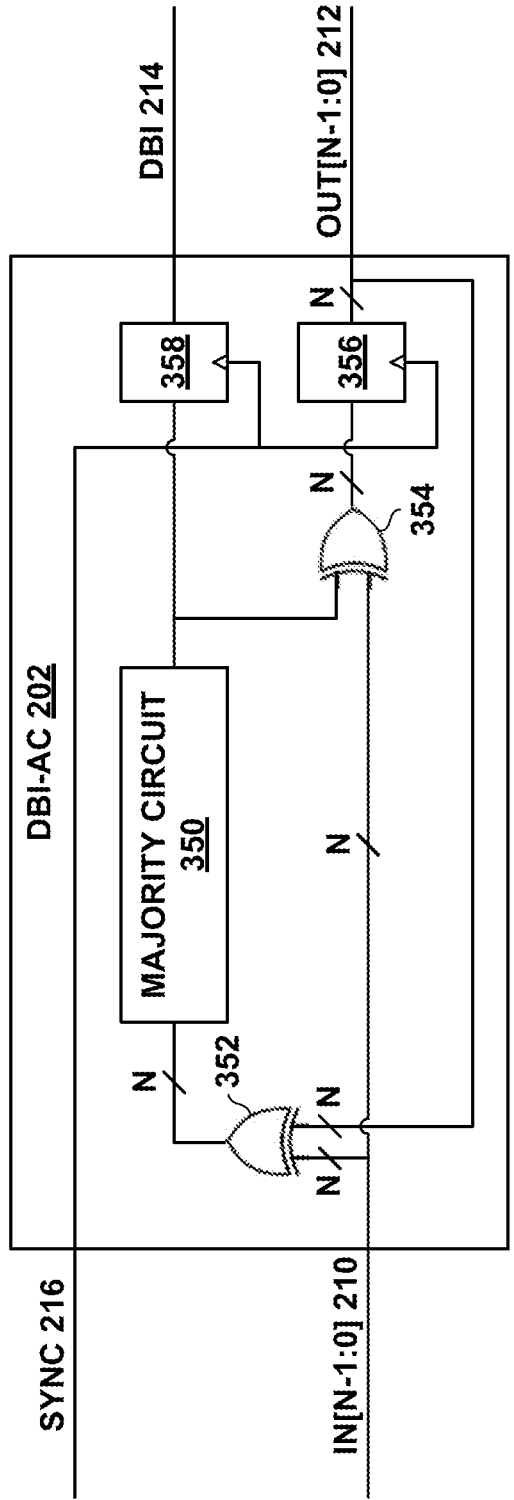
FIGS. 3A-3B are block diagrams of the DBI-AC encoder and the DBI-AC$^{-1}$ decoder of FIG. 2, according to various embodiments.
Figure 3B:
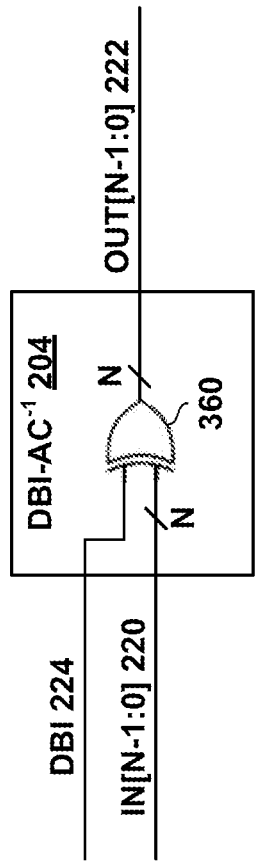

FIGS. 3A-3B are block diagrams of the DBI-AC encoder 202 and the DBI-AC$^{-1}$ decoder 204 of FIG. 2, according to various embodiments. As shown in FIG. 3A, DBI-AC encoder 202 receives an input data word IN[N−1:0] 210 to transmit to the network fabric 206 of FIG. 2. Exclusive OR (XOR) gate 352 performs a bitwise comparison of the input data word IN[N−1:0] 210 with the current output data word OUT[N−1:0] 212 that is stored by flip-flop 356. The current output data word OUT[N−1:0] 212 is associated with the previous input data word. If a bit of the input data word IN[N−1:0] 210 is the same as the corresponding bit of the previous output data word OUT[N−1:0] 212, then that bit is not transitioning. XOR gate 352 generates a logic '0' for that bit. If a bit of the input data word IN[N−1:0] 210 is different from the corresponding bit of the previous output data word OUT[N−1:0] 212, then that bit is transitioning. XOR gate 352 generates a logic '1' for that bit.

Majority circuit 350 determines the number of logic '0' bits and/or the number of logic '1' bits generated by XOR gate 352. If the number of logic '1' bits is less than or equal to the number of '0' bits, then no more than half of the bits are transitioning. In such cases, majority circuit 350 generates a logic '0' output. Majority circuit 350 transmits the logic '0' output to an input of XOR gate 354, allowing the input data word IN[N−1:0] 210 to pass through XOR gate 354 without inversion. An edge of the synchronization signal 216 causes flip-flop 356 to sample and store the non-inverted input data word IN[N−1:0] 210 at the output of XOR gate 354 to generate the output data word OUT[N−1:0] 212. In addition, the edge of the synchronization signal 216 causes flip-flop 358 to sample and store the logic '0' output of majority circuit 350 to generate the inversion output (DBI) 214.

If, on the other hand, the number of logic '1' bits is more than the number of '0' bits, then more than half of the bits are transitioning. In such cases, majority circuit 350 generates a logic '1' output. Majority circuit 350 transmits the logic '1' output to an input of XOR gate 354, allowing the input data word IN[N−1:0] 210 to be inverted through XOR gate 354. An edge of the synchronization signal 216 causes flip-flop 356 to sample and store inverted input data word IN[N−1:0] 210 at the output of XOR gate 354 to generate the output data word OUT[N−1:0] 212. In addition, the edge of the synchronization signal 216 causes flip-flop 358 to sample and store the logic '1' output of majority circuit 350 to generate the inversion output (DBI) 214.

As shown in FIG. 3B, DBI-AC$^{-1}$ decoder 204 receives the inversion input (DBI) 224 at one input of XOR gate 360. DBI-AC$^{-1}$ decoder 204 receives the input data word IN[N−1:0] 220 at another input of XOR gate 360. If the inversion input (DBI) 224 is a logic '0' input, then the input data word IN[N−1:0] 220 passes through XOR gate 360 without inversion to generate output data word OUT[N−1:0] 222. If the inversion input (DBI) 224 is a logic '1' input, then the input data word IN[N−1:0] 220 passes through XOR gate 360 with inversion to generate output data word OUT[N−1:0] 222.

In addition to the DBI-AC encoders 202 at the input of network fabric 206 and the DBI-AC$^{-1}$ decoders 204 at the output of network fabric 206, each node within network fabric 206 includes a DBI-AC$^{-1}$ decoder 204 and an DBI-AC encoder 202. As a result, the latency through network fabric 206 can be significant, depending on the number of nodes that a packet passes through between the DBI-AC encoder 202 of the source node and the DBI-AC$^{-1}$ decoder 204 of the destination node.

Figure 4:
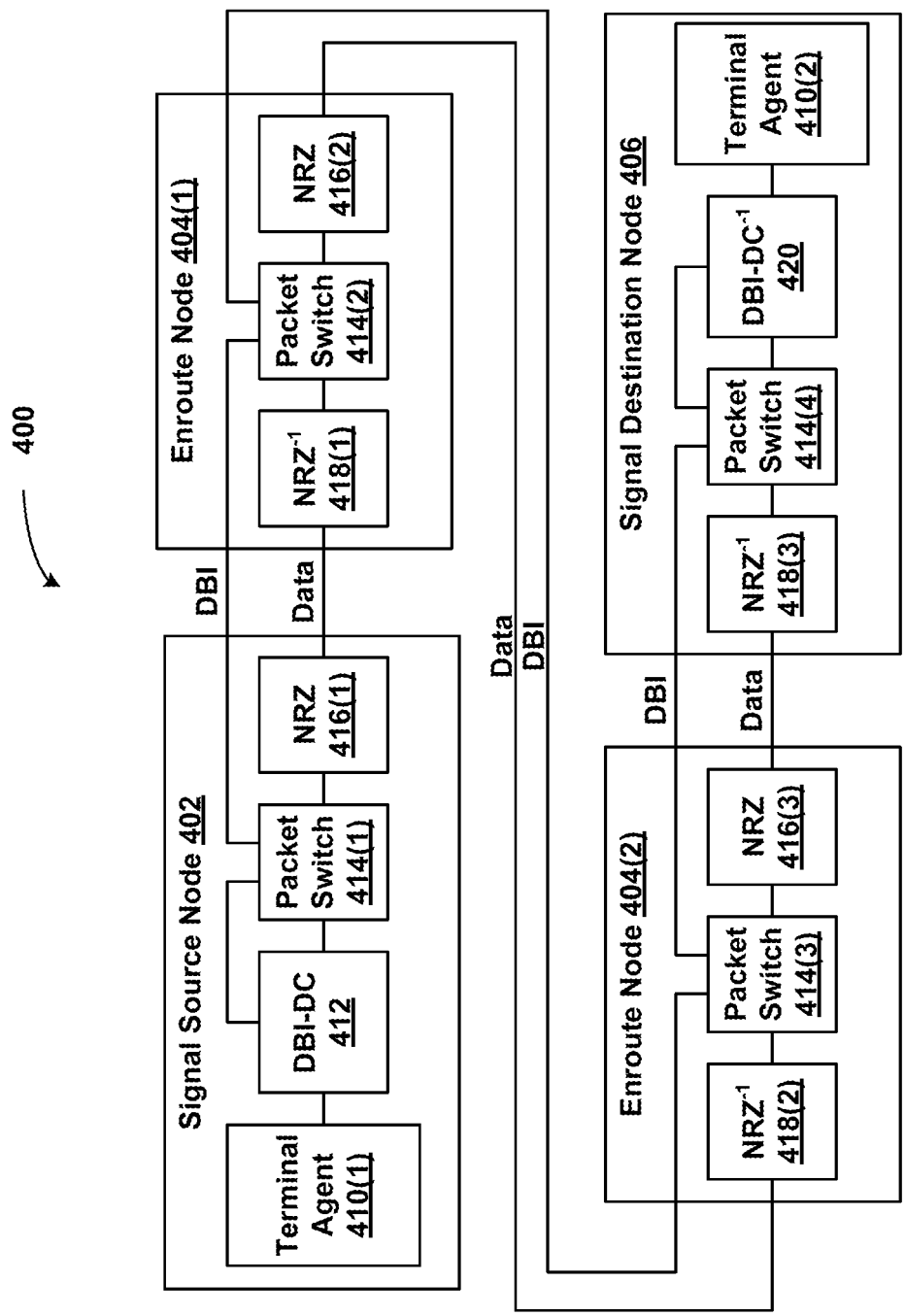
FIG. 4 is a block diagram of a data bus inversion/direct current (DBI-DC) network included in the computer system of FIG. 1, according to various embodiments.

FIG. 4 is a block diagram of a data bus inversion/direct current (DBI-DC) network 400 included in the computer system 100 of FIG. 1, according to various embodiments. As shown, DBI-DC network 400 includes a source node 402, two intermediate nodes 404(1), 404(2), and a destination node 406. Intermediate nodes 404(1), 404(2) are included in a network fabric (not shown) that includes additional intermediate nodes 404.

Source node 402 transmits packets of data words to destination node 406 via intermediate nodes 404. As shown, source node 402 transmits packets of data words to intermediate node 404(1). Intermediate node 404(1) transmits the data packets to intermediate node 404(2). Intermediate node 404(2) transmits the data packets to destination node 406. In some examples, source node 402 can transmit packets of data words to destination node 406 via any number of intermediate nodes 404 including fewer than two intermediate nodes 404 or more than two intermediate nodes 404.

Source node 402 includes a terminal agent 410, a DBI-DC encoder 412, a packet switch 414(1), and an NRZ encoder circuit 416(1). Terminal agent 410 generates packets of data words for transmission to destination node 406 and other destination nodes (not shown). Terminal agent 410 transmits the packets to DBI-DC encoder 412. DBI-DC encoder 412 encodes the packets in conformance with DBI-DC and transmits the encoded packets to packet switch 414(1). DBI-DC encoder 412 further generates a DBI inversion signal and transmits the DBI inversion signal to packet switch 414(1).

Packet switch 414(1) receives DBI-DC encoded packets from DBI-DC encoder 412 as well as DBI-DC encoded packets from other sources, such as other terminal agents, inputs from other nodes, and/or the like. Packet switch 414(1) transmits DBI-DC packets received from DBI-DC encoder 412 as well as DBI-DC encoded packets from other sources to NRZ encoder circuit 416(1). NRZ encoder circuit 416(1) encodes the packets in conformance with NRZ and transmits the NRZ encoded packets to NRZ$^{-1}$ decoder circuit 418(1) on intermediate node 404(1). Packet switch 414(1) receives a DBI inversion signal from DBI-DC encoder 412 and transmits a corresponding DBI inversion signal to packet switch 414(2) on intermediate node 404(1).

Intermediate node 404(1) receives packets from various nodes, such as source node 402, and transmits those packets to other nodes. As shown, NRZ$^{-1}$ decoder circuit 418(1) receives NRZ encoded packets from NRZ encoder circuit 416(1). NRZ$^{-1}$ decoder circuit 418(1) decodes the packets in conformance with NRZ and transmits the NRZ decoded packets to packet switch 414(2). Packet switch 414(2) transmits the NRZ decoded packets, along with packets from other nodes, to NRZ encoder circuit 416(2). NRZ encoder circuit 416(2) encodes the packets in conformance with NRZ and transmits the NRZ encoded packets to NRZ$^{-1}$ decoder circuit 418(2) on intermediate node 404(2). Packet switch 414(2) receives a DBI inversion signal from packet switch 414(1) and transmits a corresponding DBI inversion signal to packet switch 414(3) on intermediate node 404(2).

Intermediate node 404(2) receives packets from various nodes, such as intermediate node 404(1), and transmits those packets to other nodes. As shown, NRZ$^{-1}$ decoder circuit 418(2) receives NRZ encoded packets from NRZ encoder circuit 416(2). NRZ$^{-1}$ decoder circuit 418(2) decodes the packets in conformance with NRZ and transmits the NRZ decoded packets to packet switch 414(3). Packet switch 414(3) transmits the NRZ decoded packets, along with packets from other nodes, to NRZ encoder circuit 416(3). NRZ encoder circuit 416(3) encodes the packets in conformance with NRZ and transmits the NRZ encoded packets to NRZ$^{-1}$ decoder circuit 418(3) on destination node 406. Packet switch 414(3) receives a DBI inversion signal from packet switch 414(2) and transmits a corresponding DBI inversion signal to packet switch 414(4) on destination node 406.

Destination node 406 receives packets from various nodes, such as intermediate node 404(2), and transmits those packets to terminal agent 410(2) and other destination nodes in destination node 406. As shown, NRZ$^{-1}$ decoder circuit 418(3) receives NRZ encoded packets from NRZ encoder circuit 416(3). NRZ$^{-1}$ decoder circuit 418(3) decodes the packets in conformance with NRZ and transmits the NRZ decoded packets to packet switch 414(4). Packet switch 414(4) transmits the NRZ decoded packets, along with packets from other nodes, to DBI-DC$^{-1}$ decoder 420. Packet switch 414(4) receives a DBI inversion signal from packet switch 414(3) and transmits a corresponding DBI inversion signal to DBI-DC$^{-1}$ decoder 420. DBI-DC$^{-1}$ decoder 420 decodes the packets in conformance with DBI-DC. DBI-DC$^{-1}$ decoder 420 transmits the DBI-DC decoded packets to terminal agent 410(2) and other destinations in destination node 406.

Figure 5A:
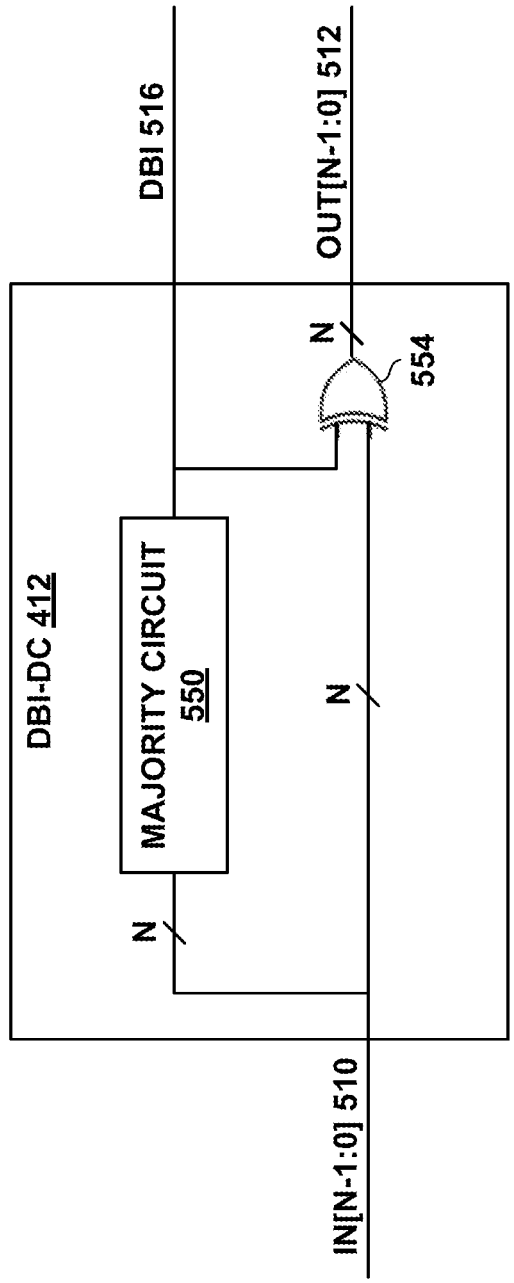
FIGS. 5A-5B are block diagrams of the DBI-DC encoder and the DBI-DC$^{-1}$ decoder of FIG. 4, according to various embodiments.
Figure 5B:
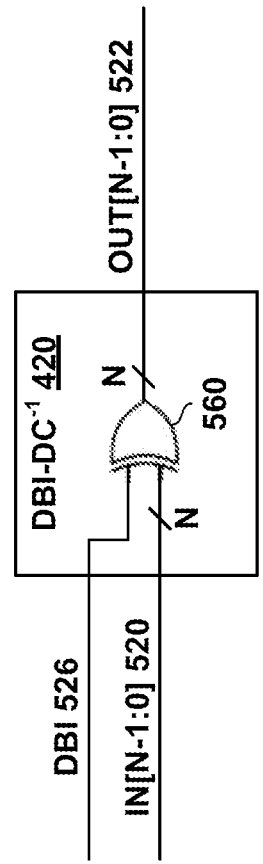

FIGS. 5A-5B are block diagrams of the DBI-DC encoder 412 and the DBI-DC$^{-1}$ decoder 420 of FIG. 4, according to various embodiments. As shown in FIG. 5A, DBI-DC encoder 412 receives an input data word IN[N–1:0] 510 to transmit. Majority circuit 550 determines the number of logic '0' bits and/or the number of logic '1' bits included in input data word IN[N–1:0] 510. If the number of logic '1' bits is less than or equal to the number of '0' bits, then no more than half of the bits have a logic '1' level. In such cases, majority circuit 550 generates a logic '0' output. Majority circuit 550 transmits the logic '0' output to an input of XOR gate 554, allowing the input data word IN[N–1:0] 510 to pass through XOR gate 554 without inversion to generate the output data word OUT[N–1:0] 512.

If, on the other hand, the number of logic '1' bits is more than the number of 'O' bits, then more than half of the bits have a logic '1' level. In such cases, majority circuit 550 generates a logic '1' output. Majority circuit 550 transmits the logic '1' output to an input of XOR gate 554, allowing the input data word IN[N–1:0] 510 to be inverted through XOR gate 554 to generate the output data word OUT[N–1:0] 512.

As shown in FIG. 5B, DBI-DC$^{-1}$ decoder 420 receives the inversion input (DBI) 526 at one input of XOR gate 560. DBI-DC$^{-1}$ decoder 420 receives the input data word IN[N–1:0] 520 at another input of XOR gate 560. If the inversion input (DBI) 526 is a logic '0' input, then the input data word IN[N–1:0] 520 passes through XOR gate 560 without inversion to generate output data word OUT[N–1:0] 522. If the inversion input (DBI) 526 is a logic '1' input, then the input data word IN[N–1:0] 520 passes through XOR gate 560 with inversion to generate output data word OUT[N–1:0] 522.

Figure 6A:
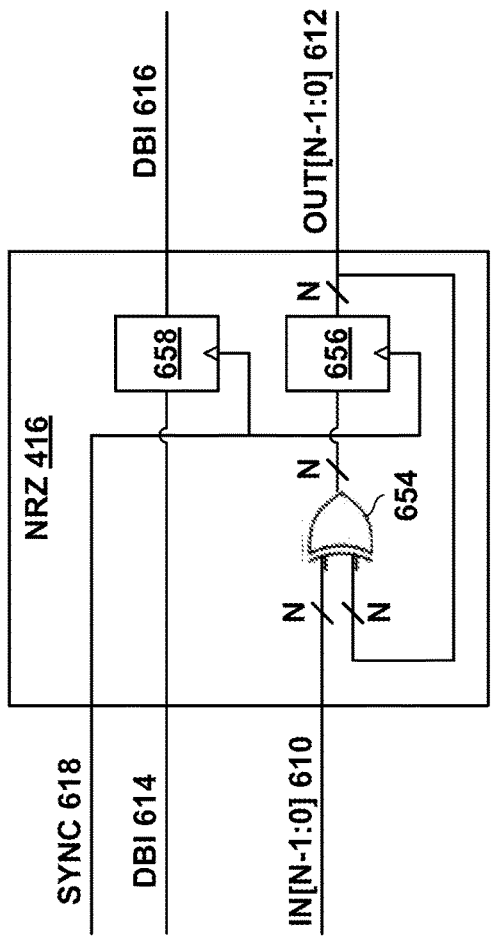
FIGS. 6A-6B are block diagrams of the NRZ circuit and the NRZ$^{-1}$ circuit of FIG. 4, according to various embodiments.
Figure 6B:
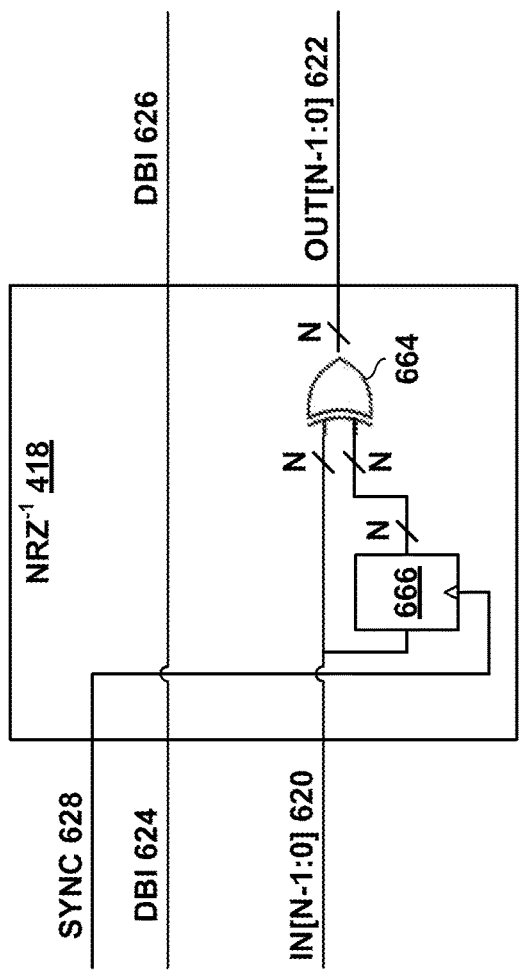

FIGS. 6A-6B are block diagrams of the NRZ encoder circuit 416 and the NRZ$^{-1}$ decoder circuit 418 of FIG. 4, according to various embodiments. As shown in FIG. 6A, NRZ encoder circuit 416 receives an input data word IN[N–1:0] 610, an inversion input (DBI) 614, and a synchronization signal (SYNC) 618. One input of XOR gate 654 receives the input data word IN[N–1:0] 610. Another input of XOR gate 654 receives an output data word OUT[N–1:0] 612, which is associated with the input data word IN[N–1:0] 610 delayed by one clock cycle of synchronization signal 618. For each bit, if the input data word IN[N–1:0] 610 and the output data word OUT[N–1:0] 612 are equal, then XOR gate 654 generates a logic '0' output for that bit. If the input data word IN[N–1:0] 610 and the output data word OUT[N–1:0] 612 are not equal, then XOR gate 654 generates a logic '1' output for that bit. An edge of the synchronization signal 618 causes flip-flop 656 to sample and store the output of XOR gate 654 to generate the output data word OUT[N–1:0] 612. The edge of the synchronization signal 618 causes flip-flop 658 to sample and store the inversion input (DBI) 614 to generate the inversion output (DBI) 616.

As shown in FIG. 6B, NRZ$^{-1}$ decoder circuit 418 receives an input data word IN[N–1:0] 620, an inversion input (DBI) 624, and a synchronization signal (SYNC) 628. An edge of the synchronization signal 628 causes flip-flop 666 to sample and store input data word IN[N–1:0] 620. One input of XOR gate 664 receives the input data word IN[N–1:0] 620. Another input of XOR gate 664 receives the output of flip-flop 666, which is the input data word IN[N–1:0] 620 delayed by one clock cycle of the synchronization signal 628. For each bit, if the input data word IN[N–1:0] 620 and the output of flip-flop 666 are equal, then XOR gate 664 generates a logic '0' output for that bit. If the input data word IN[N–1:0] 610 and the output of flip-flop 666 are not equal, then XOR gate 664 generates a logic '1' output for that bit. The output of XOR gate 664 generates the output data word OUT[N–1:0] 622. NRZ$^{-1}$ decoder circuit 418 receives the inversion input (DBI) 624 and generates an inversion output (DBI) 626.

Because NRZ encoder circuit 416 and NRZ$^{-1}$ decoder circuit 418 do not perform DBI encoding or DBI decoding, neither NRZ encoder circuit 416 nor NRZ$^{-1}$ decoder circuit 418 includes a majority circuit, where the majority circuit can introduce a significant amount of combinatorial delay. Therefore, the latency through a node that includes an NRZ encoder circuit 416 and an NRZ$^{-1}$ decoder circuit 418 is relatively low as compared with the latency through a circuit that includes a DBI encoder circuit and a DBI decoder circuit.

Figure 7:
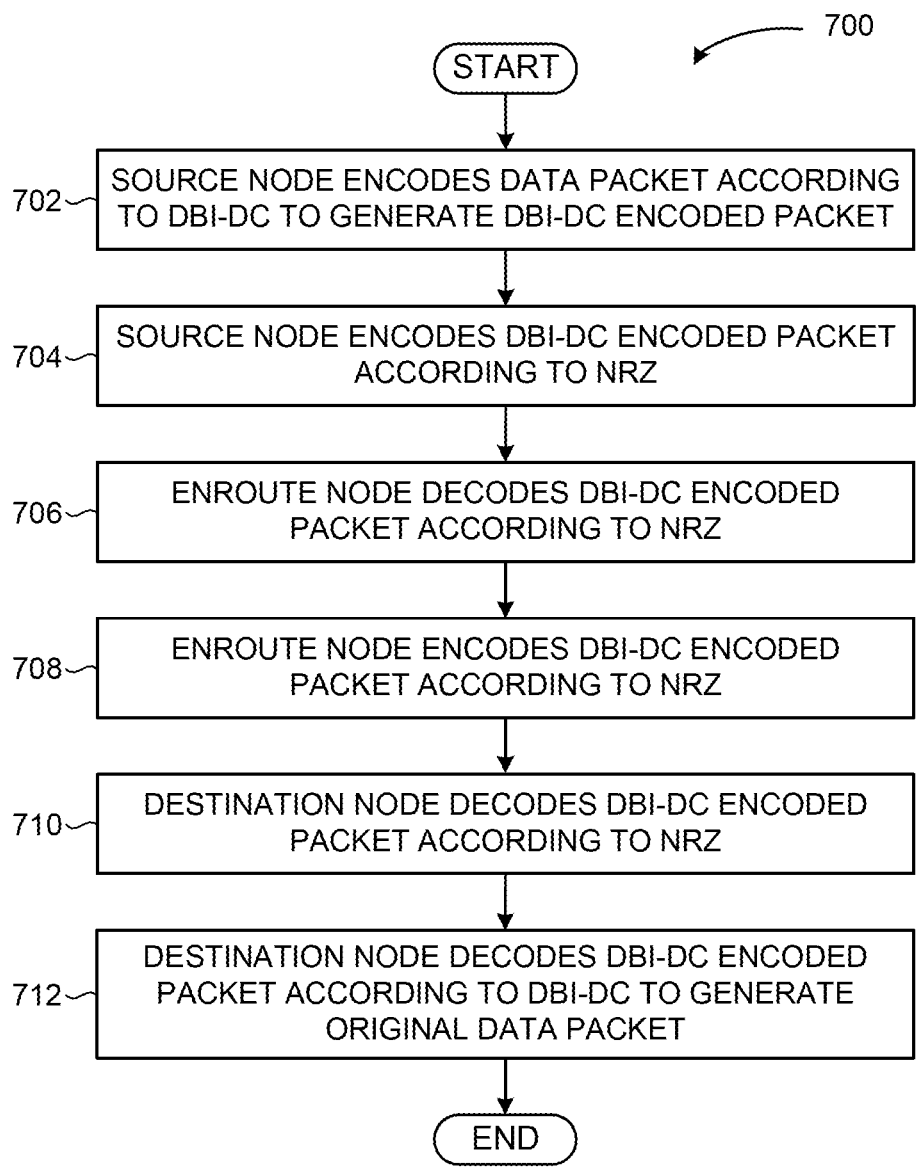
FIG. 7 is a flow diagram of method steps for transmitting packets in a network of the computer system of FIG. 1, according to various embodiments.

FIG. 7 is a flow diagram of method steps for transmitting packets in a network of the computer system 100 of FIG. 1, according to various embodiments. Although the method steps are described in conjunction with the systems of FIGS. 1-6B, persons of ordinary skill in the art will understand that any system configured to perform the method steps, in any order, is within the scope of the present disclosure.

As shown, a method 700 begins at step 702, where a source node encodes a data packet in conformance with DBI-DC to generate a DBI-DC encoded packet. The source node includes a DBI-DC encoder that receives a packet of input data words to transmit. The DBI-DC encoder includes a majority circuit that determines the number of logic '0' bits and/or the number of logic '1' bits included in each input data word of the packet. If the number of logic '1' bits in an input data word is less than or equal to the number of '0' bits, then no more than half of the bits have a logic '1' level. In such cases, the majority circuit generates a logic '0' output. The majority circuit transmits the logic '0' output to an input of an XOR gate 554, where the other input of the XOR gate 554 receives the input data word. As a result, the input data word passes through the XOR gate without inversion to generate an output data word.

If, on the other hand, the number of logic '1' bits in the input data word is more than the number of '0' bits, then more than half of the bits have a logic '1' level. In such cases, the majority circuit generates a logic '1' output. The majority circuit transmits the logic '1' output to the input of the XOR gate, allowing the input data word to be inverted through the XOR gate 554 to generate the output data word. The DBI-DC encoder generates a DBI inversion signal to indicate which data words are inverted and which data words pass through the DBI-DC encoder without inversion.

At step 704, the source node encodes the DBI-DC encoded packet in conformance with NRZ. The source node includes an NRZ encoder circuit that receives DBI-DC encoded data words from the DBI-DC encoder. One input of an XOR gate receives the DBI-DC encoded data words. Another input of the XOR gate receives an output data word, which is the input data word of the NRZ encoder circuit delayed by one clock cycle of a synchronization signal. For each bit of the data word, if the input data word and the output data word are equal, then the XOR gate generates a logic '0' output for that bit. If the input data word and the output data word are not equal, then XOR gate 654 generates a logic '1' output for that bit. An edge of a synchronization signal causes a first flip-flop to sample and store the output of the XOR gate to generate the output data word. The edge of the synchronization signal causes a second flip-flop to sample and store the DBI inversion input to generate the DBI inversion output.

At step 706, an intermediate node decodes the DBI-DC encoded packet in conformance with NRZ. The intermediate node includes an NRZ$^{-1}$ decoder circuit that receives input data words, a DBI inversion input, and a synchronization signal from the source node. An edge of the synchronization signal causes a first flip-flop to sample and store input data word. One input of an XOR gate receives the input data word. Another input of the XOR gate receives the output of a first flip-flop, which is the input data word delayed by one clock cycle of the synchronization signal. For each bit, if the input data word and the output of the first flip-flop are equal, then the XOR gate generates a logic '0' output for that bit. If the input data word and the output of the first flip-flop are not equal, then the XOR gate generates a logic '1' output for that bit. The output of the XOR gate generates the output data word. The edge of the synchronization signal causes a second flip-flop to sample and store the DBI inversion input to generate a DBI inversion output.

At step 708, the intermediate node encodes the DBI-DC encoded packet in conformance with NRZ. The intermediate node includes an NRZ encoder circuit that encodes the DBI-DC encoded packet as described in conjunction with step 704.

At step 710, a destination node decodes the DBI-DC encoded packet in conformance with NRZ. The destination node includes an NRZ$^{-1}$ decoder circuit that decodes the DBI-DC encoded packet as described in conjunction with step 706.

At step 712, the destination node decodes the DBI-DC encoded packet in conformance with DBI-DC to generate the original data packet. The destination node includes a DBI-DC$^{-1}$ decoder that receives a DBI inversion input at one input of an XOR gate. The DBI-DC$^{-1}$ decoder receives the DBI-DC encoded data word at another input of XOR gate. If the DBI inversion input is a logic '0' input, then the input data word passes through the XOR gate without inversion to generate an output data word. If the DBI inversion input is a logic '1' input, then the input data word passes through the XOR gate with inversion to the generate output data word.

The method 700 then terminates. Alternatively, the method 700 proceeds to step 702 to transmit additional packets.

In sum, various embodiments are directed towards techniques for transmitting data packets in a computer system network fabric. Conventional DBI implementations apply a DBI-AC encoding/decoding technique. With DBI-AC, each data word in a data packet is inverted for transmission if transmitting the inverted data word results in fewer transitions than transmitting the original non-inverted data word. The decision to invert depends on the previously transmitted data word. Further, each node in the network fabric receives data packets from multiple source nodes via multiple ingress ports and transmits data packets to multiple destination nodes and other nodes via multiple egress ports. Because consecutive data words transmitted on an egress port could from different source nodes, the previous data word could be from a different source node than the current data word. Therefore, in order to correctly encode the packets, the node performs DBI-AC decoding on the packets received at the ingress ports, routes each of the received packets to the appropriate egress ports, and, for each egress port, reencodes the data packets transmitted by that egress port. The process of decoding and reencoding at each node can introduce significant transmission latency, leading to reduced network performance.

With the disclosed techniques, DBI encoding is performed once at the source node. The source node applies a form of DBI encoding referred to herein as data bus inversion/direct current (DBI-DC) encoding/decoding. DBI-DC encoding is performed once, at the source node, as the packet is transmitted to the network. With DBI-DC encoding, the source node determines that a data word is inverted for transmission if transmitting the inverted data word results in fewer logic '1' bits than transmitting the original non-inverted data word. This determination does not depend on the previous data word that was transmitted. After DBI-DC encoding, less than or equal to 50% of the bits of the encoded word are logic '1' bits. The source node further transmits an inversion bit that indicates, for each data word, whether the data word is inverted.

Each intermediate node applies a non-return-to-zero (NRZ) encoding/decoding technique to the DBI-DC encoded packet. NRZ encoding generates a transition on word bits that are logic '1' bits. With DBI-DC encoding, the number of logic '1' bits for each data word is no more than 50%. Therefore, the data word, after both outer and inner encoding are applied, results in no more than 50% transitions on the data word transmitted through the network. NRZ encoding/decoding has lower latency relative to conventional nodes that apply DBI-AC encoding/decoding. The destination node applies DBI-DC decoding to recover the original data words of the packet. As a result, the network applies DBI-DC outer encoding and NRZ inner encoding.

At least one technical advantage of the disclosed techniques relative to the prior art is that, with the disclosed techniques, intermediate nodes in a network do not need to perform DBI decoding and DBI encoding of received packets in order to forward the received packets to the destination node or to another intermediate node. Instead, DBI-DC encoding is performed at the source node and DBI-DC decoding is performed at the destination node, along with NRZ encoding/decoding at the intermediate nodes. This approach achieves the same reduction in transitions as conventional DBI-AC encoding/decoding, but with lower latency and higher network performance. As a result, the latency from when a source node transmits packets, and the corresponding destination node receives the packets is reduced relative to conventional techniques. This reduced packet latency results in increased instruction throughput of the computer system processing elements, leading to higher performance. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transmitting packets in a computer-based network, the method comprising:

decoding, by an intermediate node, a first data bus inversion/direct current (DBI-DC) encoded data word received from a first source node;

applying, by the intermediate node, non-return-to-zero (NRZ) encoding to the first DBI-DC encoded data word to generate a second DBI-DC encoded data word; and transmitting, by the intermediate node, the second DBI-DC encoded data word to a destination node, wherein the second DBI-DC encoded data word is decoded at the destination node using NRZ decoding and DBI-DC decoding.

2. The computer-implemented method of claim 1, further comprising:

decoding, by the intermediate node, a third DBI-DC encoded data word received from a second source node;

applying, by the intermediate node, NRZ encoding to the third DBI-DC encoded data word to generate a fourth DBI-DC encoded data word, wherein the encoding applied to the third DBI-DC encoded data word is independent from the encoding applied to the first DBI-DC encoded data word; and transmitting, by the intermediate node, the fourth DBI-DC encoded data word to the destination node, wherein the fourth DBI-DC encoded data word is decoded at the destination node using NRZ decoding and DBI-DC decoding.

3. The computer-implemented method of claim 1, wherein the first DBI-DC encoded data word is encoded using DBI-DC encoding and NRZ encoding, and wherein decoding the first DBI-DC encoded data word comprises:

applying, by the intermediate node, NRZ decoding to the first DBI-DC encoded data word.

4. The computer-implemented method of claim 1, wherein the first source node encodes the first DBI-DC encoded data word by:

determining that a majority of bits in an unencoded data word are at a logic '1' level;

inverting the bits of the unencoded data word to generate the first DBI-DC encoded data word; and transmitting, to the intermediate node, the first DBI-DC encoded data word and an inversion signal indicating that the first DBI-DC encoded data word is inverted.

5. The computer-implemented method of claim 1, wherein the first source node encodes the first DBI-DC encoded data word by:

determining that less than a majority of bits in an unencoded data word are at a logic '1' level;

maintaining the bits of the unencoded data word to generate the first DBI-DC encoded data word; and transmitting, to the intermediate node, the first DBI-DC encoded data word and an inversion signal indicating that the first DBI-DC encoded data word is not inverted.

6. The computer-implemented method of claim 1, wherein decoding the first DBI-DC encoded data word comprises:

applying an exclusive-or (XOR) function to the first DBI-DC encoded data word and a third DBI-DC encoded data word, wherein the third DBI-DC encoded data word was previously received from the first source node.

7. The computer-implemented method of claim 1, wherein applying NRZ encoding to the first DBI-DC encoded data word comprises:

applying an exclusive-or (XOR) function to the first DBI-DC encoded data word and a third DBI-DC encoded data word, wherein the third DBI-DC encoded data word was previously transmitted by the intermediate node to the destination node.

8. The computer-implemented method of claim 1, further comprising:

transmitting, by the intermediate node, an inversion signal received from the first source node to the destination node.

9. The computer-implemented method of claim 1, wherein the destination node decodes the second DBI-DC encoded data word by:

determining that an inversion signal indicates the second DBI-DC encoded data word is inverted; and inverting bits of the second DBI-DC encoded data word to generate an unencoded data word.

10. The computer-implemented method of claim 1, wherein the destination node decodes the second DBI-DC encoded data word by:

determining that an inversion signal indicates the second DBI-DC encoded data word is not inverted; and maintaining bits of the second DBI-DC encoded data word to generate an unencoded data word.

11. A system, comprising:

a first source node that:

generates a first data bus inversion/direct current (DBI-DC) encoded data word; and transmits the first DBI-DC encoded data word to an intermediate node, the intermediate node that:

decodes the first DBI-DC encoded data word received from the first source node;

applies non-return-to-zero (NRZ) encoding to the first DBI-DC encoded data word to generate a second DBI-DC encoded data word; and transmits the second DBI-DC encoded data word to a destination node, and the destination node that:

applies NRZ decoding and DBI-DC decoding to the second DBI-DC encoded data word.

12. The system of claim 11, wherein the system further comprises a second source node, wherein the intermediate node further:

decodes a third DBI-DC encoded data word received from a second source node;

applies NRZ encoding to the third DBI-DC encoded data word to generate a fourth DBI-DC encoded data word, wherein the encoding applied to the third DBI-DC encoded data word is independent from the encoding applied to the first DBI-DC encoded data word; and transmits the fourth DBI-DC encoded data word to the destination node, and wherein the destination node further:

decodes the fourth DBI-DC encoded data word using NRZ decoding and DBI-DC decoding.

13. The system of claim 11, wherein the first DBI-DC encoded data word is encoded using DBI-DC encoding and NRZ encoding, and wherein, to decode the first DBI-DC encoded data word, the intermediate node:

applies NRZ decoding to the first DBI-DC encoded data word.

14. The system of claim 11, wherein, to encode the first DBI-DC encoded data word, the first source node:

determines that a majority of bits in an unencoded data word are at a logic '1' level;

inverts the bits of the unencoded data word to generate the first DBI-DC encoded data word; and transmits, to the intermediate node, the first DBI-DC encoded data word and an inversion signal indicating that the first DBI-DC encoded data word is inverted.

15. The system of claim 11, wherein, to encode the first DBI-DC encoded data word, the first source node:
   determines that less than a majority of bits in an unencoded data word are at a logic '1' level;
   maintains the bits of the unencoded data word to generate the first DBI-DC encoded data word; and
   transmits, to the intermediate node, the first DBI-DC encoded data word and an inversion signal indicating that the first DBI-DC encoded data word is not inverted.

16. The system of claim 11, wherein, to decode the first DBI-DC encoded data word, the intermediate node:
   applies an exclusive-or (XOR) function to the first DBI-DC encoded data word and a third DBI-DC encoded data word,
   wherein the third DBI-DC encoded data word was previously received from the first source node.

17. The system of claim 11, wherein, to apply NRZ encoding to the first DBI-DC encoded data word, the intermediate node:
   applies an exclusive-or (XOR) function to the first DBI-DC encoded data word and a third DBI-DC encoded data word,
   wherein the third DBI-DC encoded data word was previously transmitted by the intermediate node to the destination node.

18. The system of claim 11, wherein the intermediate node further:
   transmits an inversion signal received from the first source node to the destination node.

19. The system of claim 11, wherein, decode the second DBI-DC encoded data word, the destination node:
   determines that an inversion signal indicates the second DBI-DC encoded data word is inverted; and
   inverts bits of the second DBI-DC encoded data word to generate an unencoded data word.

20. The system of claim 11, wherein, to decode the second DBI-DC encoded data word, the destination node:
   determines that an inversion signal indicates the second DBI-DC encoded data word is not inverted; and
   maintains bits of the second DBI-DC encoded data word to generate an unencoded data word.

\* \* \* \* \*